(12) United States Patent
Nakagawa et al.

(10) Patent No.: US 7,435,002 B2
(45) Date of Patent: Oct. 14, 2008

(54) BEARING UNIT

(75) Inventors: Hisaya Nakagawa, Nagano (JP); Michiaki Takizawa, Nagano (JP); Toru Nakanishi, Nagano (JP); Takeshi Kaneko, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 372 days.

(21) Appl. No.: 11/321,125

(22) Filed: Dec. 28, 2005

(65) Prior Publication Data

US 2006/0171620 A1    Aug. 3, 2006

(30) Foreign Application Priority Data

Dec. 28, 2004    (JP)    ............... 2004-379240

(51) Int. Cl.
*F16C 32/06*    (2006.01)

(52) U.S. Cl. ...................... 384/107; 384/279

(58) Field of Classification Search ................. 384/100, 384/107, 114, 118, 120, 279, 902; 360/99.08, 360/98.07; 417/354, 423.12, 423.13; 310/90
See application file for complete search history.

(56) References Cited

U.S. PATENT DOCUMENTS

| | | | | |
|---|---|---|---|---|
| 3,601,459 A | * | 8/1971 | Cutting ...................... | 384/100 |
| 5,715,116 A | * | 2/1998 | Moritan et al. ............ | 360/99.08 |
| 5,785,429 A | * | 7/1998 | Jeong ......................... | 384/397 |
| 5,863,134 A | * | 1/1999 | Chen ........................... | 384/118 |
| 5,941,646 A | * | 8/1999 | Mori et al. .................. | 384/279 |
| 6,244,749 B1 | * | 6/2001 | Nakagawa et al. .......... | 384/114 |

FOREIGN PATENT DOCUMENTS

JP    03-107612    5/1991

* cited by examiner

*Primary Examiner*—Thomas R Hannon
(74) *Attorney, Agent, or Firm*—Reed Smith LLP

(57) ABSTRACT

A bearing unit comprises a cylindrical oil-impregnated bearing, in which a bearing bore to support a turning shaft is formed so as to enable the turning shaft to turn; a bearing holder, in which the oil-impregnated bearing is fixed by an inner bore; a first groove being formed in an axial direction on an inner circumferential surface of the oil-impregnated bearing; and a second groove being formed in an axial direction on at least one of an outer circumferential surface of the oil-impregnated bearing and an inner circumferential surface of the bearing holder. The second groove is formed so as to have a greater depth than that of the first groove. The second groove is also formed so as to have a larger cross section than that of the first groove.

6 Claims, 7 Drawing Sheets

Fig. 1
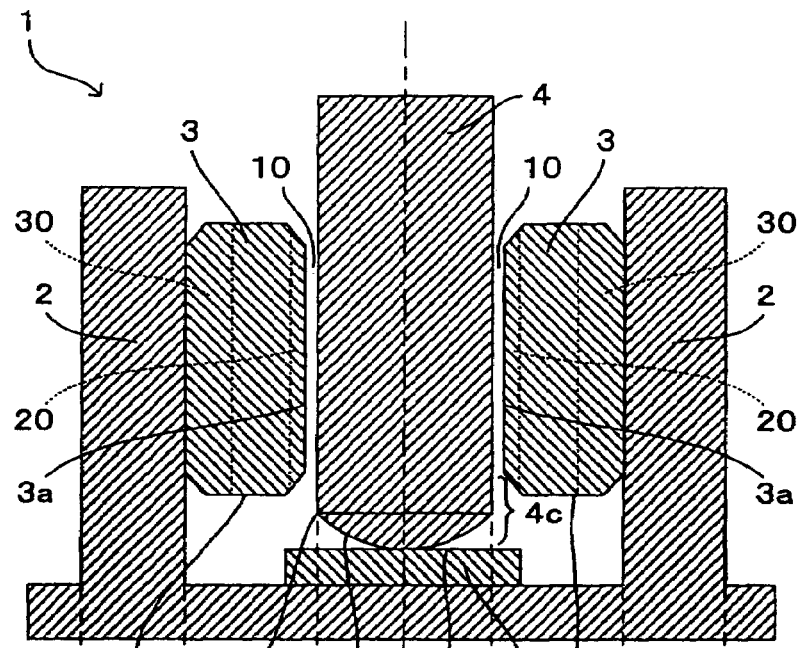
Fig.1(a)
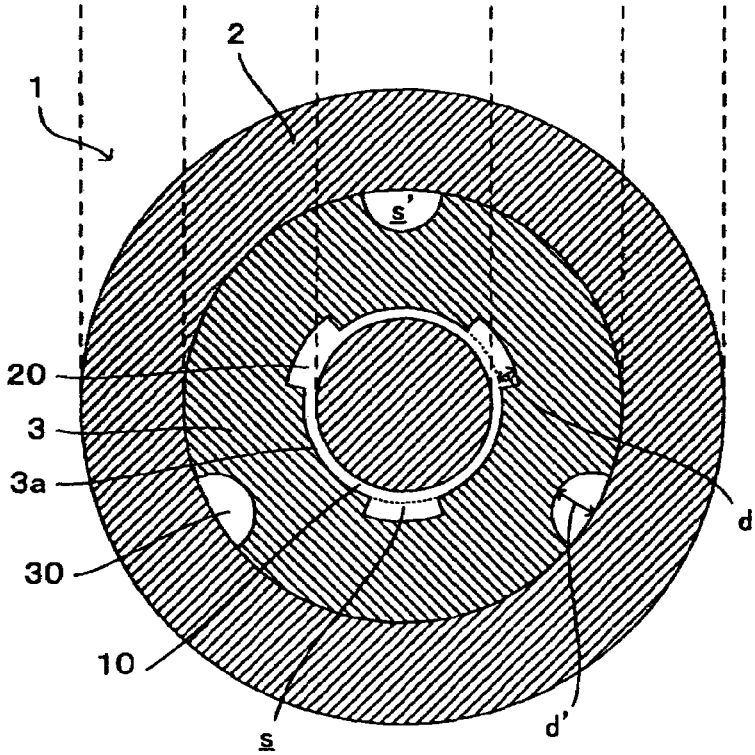
Fig.1(b)

Fig. 6
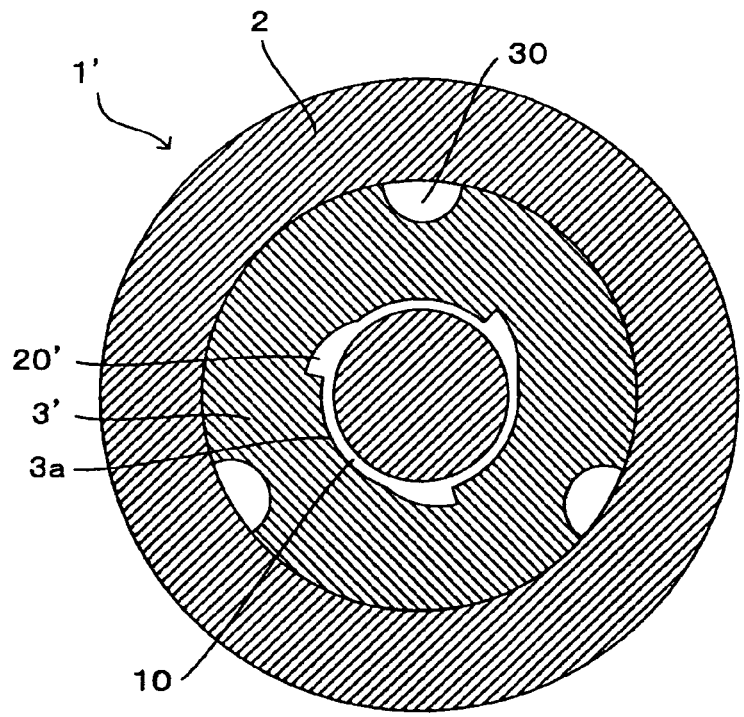
Fig 6(a)
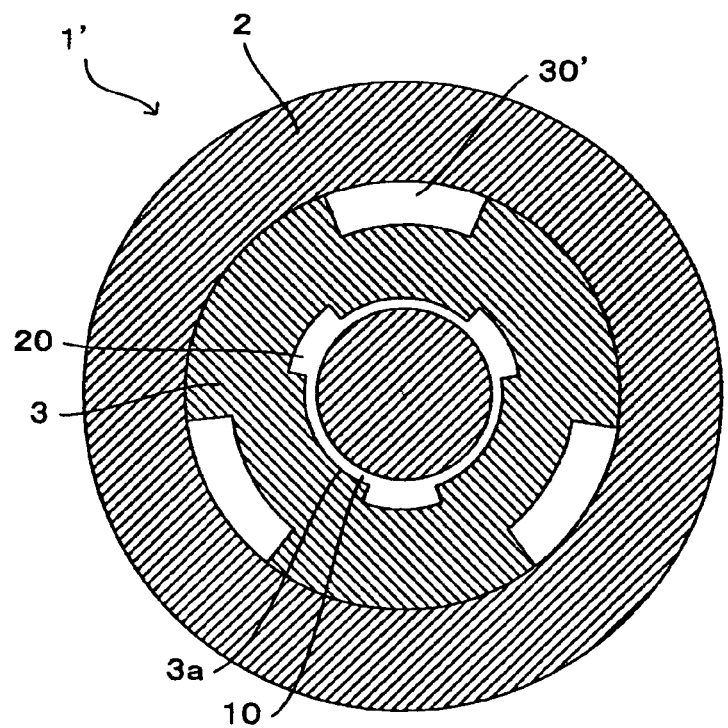
Fig 6(b)

[Fig. 9]
Prior Art
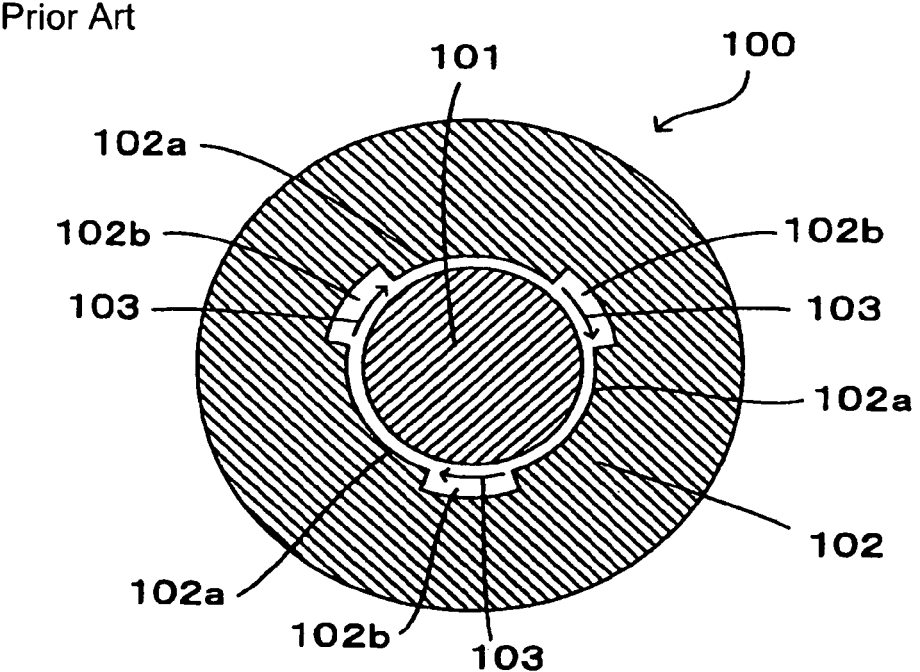
[Fig. 10]
Prior Art
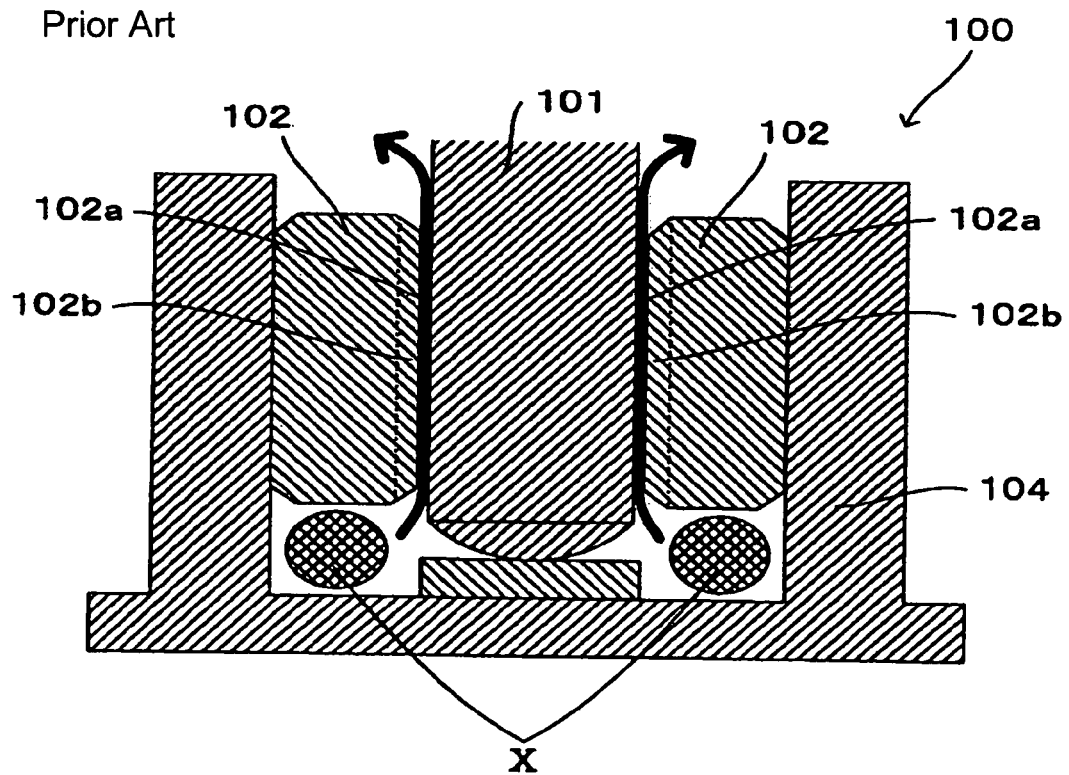

BEARING UNIT

CROSS-REFERENCE TO RELATED APPLICATION

This application claims priority of Japanese Application No. 2004-379240, filed Dec. 28, 2004, the complete disclosure of which is hereby incorporated by reference.

BACKGROUND OF THE INVENTION a) Field of the Invention

The present invention relates to a bearing unit, in which a turning shaft (shaft) inserted into an oil-impregnated material part is supported so as to be able to turn, and in particular, relates to a bearing unit that can prevent a lubricant existing between an inner circumferential surface of the oil-impregnated material part and the turning shaft from leaking out.

b) Description of the Prior Art

In the past, there have been fluid dynamic bearing units used for supporting polygon mirrors, optical discs, and so on that turn. In such a fluid dynamic bearing unit, a fluid dynamic pressure surface of the turning shaft and a fluid dynamic pressure surface of the oil-impregnated material part, which are both ring-shaped and have a clearance between the two in a radial direction, are placed so as to face each other. Then, the lubricant fluid such as oil and so on, injected into the clearance space, is pressurized at the time when the turning shaft turns. This is done by pumping operation as a means of generating fluid dynamic pressure, which is set up for either or both the turning shaft and the oil-impregnated material part. As a result, the turning shaft is supported so as to be able to turn relatively to the oil-impregnated material part, by the fluid dynamic pressure of the lubricant fluid.

Among those fluid dynamic bearing units, some are provided with grooves, such as herringbone-shaped, spiral-shaped, and so on, in order to generate fluid dynamic pressure as a means of generating fluid dynamic pressure. Furthermore, there is also a step-groove fluid dynamic bearing unit (Rayleigh step fluid dynamic bearing unit), having grooves (concave sections) on an inner circumferential wall surface that are deeper in depth and provided with a larger cross section than the grooves, such as herringbone-shaped, spiral-shaped, and so on, in order to generate fluid dynamic pressure as a means of generating fluid dynamic pressure. (for example, refer to Japanese Unexamined Patent Publication (Kokai) No. 3-107612 (FIG. 1).

FIG. 9 is a widthwise cross sectional view to show a mechanical structure of a conventional step-groove fluid dynamic bearing unit 100.

In FIG. 9, the conventional step-groove fluid dynamic bearing unit 100 is provided with, for example, fluid dynamic pressure generating surfaces 102a at 3 locations intermittently; each of which is equipped with a convex surface protruding in a radial direction with a stepped shape, on an inner circumferential wall surface of an oil-impregnated material part 102 surrounding a turning shaft 101 in a circumferential direction. When a lubricant fluid 103, such as oil and so on, (flowing in a CW direction in FIG. 9) is pressurized while being squeezed at a narrow space formed between each fluid dynamic pressure generating surface 102a and an outer circumferential surface of the turning shaft 101, fluid dynamic pressure is generated as required.

Furthermore, concave sections 102b are provided at 3 locations intermittently, while adjoining to each edge section of the fluid dynamic pressure generating surface 102a and forming grooves with a stepped shape in a radial direction. The concave sections 102b are placed for the purpose of canceling negative pressure that is caused together with the fluid dynamic pressure generated at the fluid dynamic pressure generating surface 102a. Each concave section 102b has a groove of a few microns to 0.1 mm approximately in depth in its inner radius direction, and it can be formed by making a copy of a shape of a forming core and a sizing core, having the same shape as required, on an internal surface of the bearing section material. Moreover, porous minute holes in the fluid dynamic pressure generating surface 102a are made to be fine and fewer, while those in the concave section 102b are made to be rough and more.

The step-groove fluid dynamic bearing unit 100 described above by referring to FIG. 9 is suitable for spindle motors free from any lateral load, especially for spindle motors of floppy disc drive units.

DISCLOSURE OF THE INVENTION

Problem to Be Solved

However, in the step-groove fluid dynamic bearing unit 100 described above, a problem arises as described below by referring to FIG. 10. FIG. 10 is a longitudinal cross sectional view to show a mechanical structure of the conventional step-groove fluid dynamic bearing unit 100. A component pertinent to its corresponding part in the step-groove fluid dynamic bearing unit 100 described by referring to FIG. 9 is referred to with the same reference number as shown in FIG. 9.

In the step-groove fluid dynamic bearing unit 100 of FIG. 10, a space X is formed by surrounding with a bottom end surface of the oil-impregnated material part 102, a bottom end surface of the turning shaft 101, and a bearing holder 104. Then, the air in the space X may sometimes be heated up by heat generation due to the motor operation so as to get expanded. Therefore, in this case, a flow of the air toward a rotor side (refer to the direction that the thick arrows indicate in FIG. 10) is generated, and there comes up a chance that the lubricant fluid 103, existing between a fluid dynamic pressure surface of the turning shaft 101 and the fluid dynamic pressure generating surface 102a of the oil-impregnated material part 102, may leak out externally.

In particular, capillary attraction force at the concave section 102b is less in comparison with other capillary attraction force at the clearance between the fluid dynamic pressure surface of the turning shaft 101 and the fluid dynamic pressure generating surface 102a of the oil-impregnated material part 102. Eventually, there arises a chance that the lubricant fluid 103 existing in the concave section 102b may centrally leak out. Moreover, in the case of the step-groove fluid dynamic bearing unit 100 equipped with no groove, such as herringbone-shaped, spiral-shaped, and so on, to generate fluid dynamic pressure, since an action of collecting the lubricant fluid 103 into the fluid dynamic bearing section (an action of controlling the lubricant fluid's move in the turning shaft direction) is less, there is a chance of the lubricant fluid 103 leaking out may be increased.

Under such circumstances having a condition of insufficient amount of the lubricant fluid 103 (i.e., a shortage of oil), there may arise a chance of vibration, noise, cavitation to cause damage so as to eventually deteriorate the dynamic performance (motor performance) as required, and, further, in the worst case case, seizing may be caused.

OBJECT AND SUMMARY OF THE INVENTION

The present invention has been developed in view of the technical problem described above, and the primary objective of the present invention is to provide a bearing unit that can prevent a lubricant existing between an inner circumferential surface of the oil-impregnated material part and the turning shaft from leaking out.

To solve the problem identified above, according to the present invention, a bearing unit comprises: a cylindrical oil-impregnated bearing, in which a bearing bore to support a turning shaft is formed so as to enable the turning shaft to turn; a bearing holder, in which the oil-impregnated bearing is fixed by an inner bore; and a first groove in an axial direction formed on an inner circumferential surface of the oil-impregnated bearing; wherein a second groove in an axial direction is formed on at least one of an outer circumferential surface of the oil-impregnated bearing and an inner circumferential surface of the bearing holder; the second groove is formed so as to have a greater depth than the first groove has; and the second groove is formed so as to have a larger cross section than the first groove has.

According to the present invention, in a bearing unit comprising: a oil-impregnated bearing, a bearing holder, and a first groove, such as step-shaped or tapered, in an axial direction formed on an inner circumferential surface of the oil-impregnated bearing; a second groove in an axial direction is formed on at least one of an outer circumferential surface of the oil-impregnated bearing and an inner circumferential surface of the bearing holder; the second groove is formed so as to have a greater depth than the first groove has; and the second groove is formed so as to have a larger cross section than the first groove has. As a result, the air held in a space surrounded by a bottom end surface of the oil-impregnated bearing, a bottom end section of the turning shaft, and the bearing holder can appropriately be discharged externally through the second groove.

That is to say, in the case of the step-groove fluid dynamic bearing unit 100 (refer to FIG. 10), when the air in the space X gets heated up by heat generation due to the motor operation so as to become expanded, the lubricant fluid 103 existing in the clearance formed between the fluid dynamic pressure surface of the turning shaft 101 and the fluid dynamic pressure generating surface 102a of the oil-impregnated material part 102 (in particular, at the concave section 102b provided with less capillary attraction force), may leak out. However, according to the present invention, the second groove formed under the conditions described above is provided with capillary attraction force that is less than the capillary attraction force generated, doubtlessly not only at the clearance formed between the fluid dynamic pressure surface of the turning shaft 101 and the fluid dynamic pressure generating surface 102a of the oil-impregnated material part 102, but also at the concave section 102b (the first groove). Therefore, accordingly the air held in the space X is appropriately discharged externally through the second groove.

Consequently, it is possible to prevent the lubricant fluid (in particular, the lubricant fluid existing in the first groove) from leaking out. Moreover, it becomes possible to prevent vibration, noise, and cavitation from being caused and to check any deterioration of the dynamic performance (motor performance) as required.

Herein, as a shape of the first groove, a stepped shape, a tapered shape, a multi-lobe shape, and so on can be listed. As a shape of the second groove, a stepped shape, a semicircle, and so forth can be named.

In the present invention, it is preferable that the first groove and the second groove are each formed in plural numbers, and a total cross section of the second grooves is greater than a total cross section of the first grooves is.

According to the present invention, in addition to the conditions described above, the second grooves are formed so as to have a larger total cross section than the first grooves have. Therefore, the air held in the space surrounded by the bottom end surface of the oil-impregnated bearing, the bottom end section of the turning shaft, and the bearing holder can further surely be discharged externally through the second grooves, and consequently it is possible to prevent the lubricant fluid (in particular, the lubricant fluid existing in the first grooves) from leaking out.

In the present invention, it is preferable that a part of the plurality of second grooves is formed so as to be shallower in the depth direction than the other second grooves are.

According to the present invention, a part of the plurality of second grooves is formed so as to be shallower in the depth direction than the other second grooves are. Therefore, the air held in the space surrounded by the bottom end surface of the oil-impregnated bearing, the bottom end section of the turning shaft, and the bearing holder can appropriately be discharged externally through the other second grooves, and meanwhile an excessive lubricant remaining in the part of the plurality of second grooves can be collected within the oil-impregnated bearing.

In the present invention, it is preferable that a part of the plurality of second grooves is formed so as to have a rougher porous structure than the other second grooves are.

According to the present invention, a part of the plurality of second grooves is formed so as to have a rougher porous structure than the other second grooves are. Therefore, the part of the plurality of second grooves can have higher collection efficiency of an excessive lubricant.

In the present invention, it is preferable that the first groove and the second groove are laid out in such a manner that the first groove and the second groove are not oriented in the same radial direction.

According to the present invention, the first groove and the second groove described above are laid out in such a manner that the first groove and the second groove are not oriented in the same radial direction. Therefore, even in a case where the bearing is downsized so that the bearing's wall thickness in the radial direction becomes thin, it is still possible to avoid any form deterioration of the bearing at the time when the first groove and the second groove are formed, and also when the bearing is press-fit, so as to maintain dimensional accuracy of the bearing.

In the present invention, it is preferable that the first groove is a stepped groove protruding in a radial direction with a stepped shape.

According to the present invention, the first groove described above is a stepped groove protruding in a radial direction with a stepped shape. Therefore, providing the second groove, whose capillary attraction force is less than that of the stepped groove, makes it possible to discharge the air further surely, and consequently it becomes possible to prevent the lubricant fluid from leaking out.

As described above, in a bearing unit relating to the present invention, a second groove is formed on at least one of an outer circumferential surface of the oil-impregnated bearing and an inner circumferential surface of the bearing holder, being deeper in a depth direction than a first groove, which is formed in an axial direction on an inner circumferential surface of the oil-impregnated bearing, and having a larger cross section than the first groove has. As a result, the air held in a space surrounded by a bottom end surface of the oil-impregnated bearing, a bottom end section of the turning shaft, and the bearing holder can appropriately be discharged externally through the second groove. Consequently it is possible to prevent a lubricant existing between an inner surface of the oil-impregnated material part and the turning shaft from leaking out.

A preferred embodiment of the present invention is described below with reference to the accompanying drawings.

BRIEF DESCRIPTION OF THE DRAWINGS

In the drawings:

FIG. 1 shows cross section drawings of mechanical constitution of a bearing unit relating to an embodiment of the present invention;

FIG. 6 is widthwise cross sectional drawings to illustrate mechanical constitution of bearing units relating to still other embodiments of the present invention;

FIG. 9 is a widthwise cross sectional view drawing to show a mechanical structure of a conventional step-groove fluid dynamic bearing unit; and FIG. 10 is a longitudinal cross sectional view drawing to show a mechanical structure of a conventional step-groove fluid dynamic bearing unit.

DESCRIPTION OF THE PREFERRED EMBODIMENTS

Figure 2:
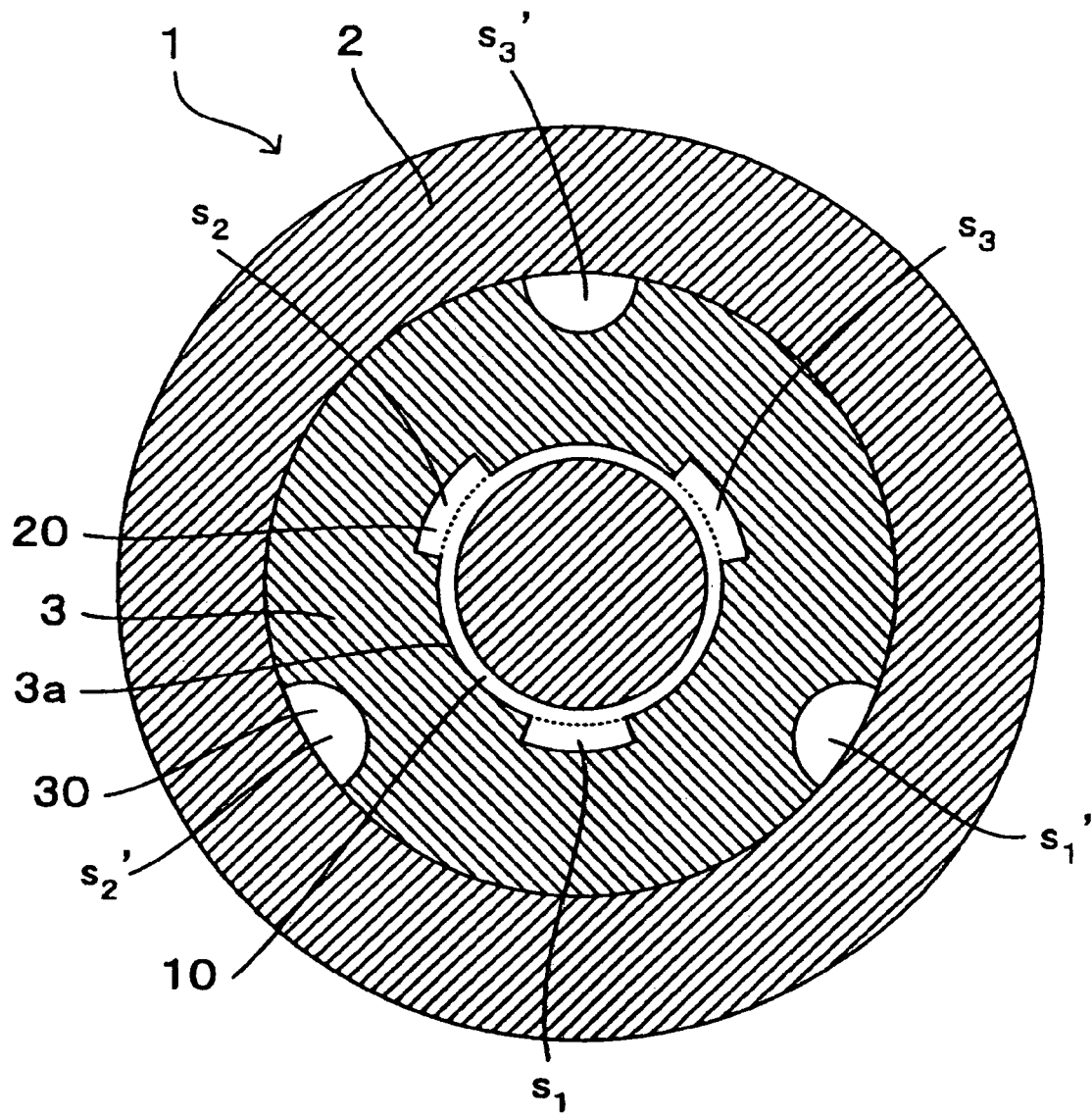
FIG. 2 is an explanatory drawing to explain an additional condition on a relationship formula being valid between step grooves and air discharging grooves shown in the widthwise cross sectional view drawing of FIG. 1B.

FIG. 1 shows cross section drawings of mechanical constitution of a bearing unit 1 relating to an embodiment of the present invention. In more detail, FIG. 1A and FIG. 1B are a longitudinal cross sectional view of the bearing unit 1 in the horizontal viewing direction and a widthwise cross sectional view of the top view of the bearing unit 1, respectively.

In FIG. 1A, the bearing unit 1 relating to an embodiment of the present invention includes: a cylindrical step-groove bearing 3, which is press-fitted in an inner bore of a bearing holder 2 so as to be fitted and held there and in which a bearing bore to support a turning shaft 4 is formed so as to enable the turning shaft 4 to turn, and a thrust bearing 5 to support a bottom end surface 4a of the turning shaft 4. It is also possible to install a spacer or equivalent (not illustrated) at a side of the thrust bearing 5 of the bearing holder 2 of the step-groove bearing 3, and a fixing material part or equivalent (not illustrated) at an opening part side of the bearing holder 2 for fixing the step-groove bearing 3.

Material of the step-groove bearing 3 is composed of 50% copper and 50% iron, etc., and the step-groove bearing 3 is equipped with a step-groove bearing surface 3a that faces an outer circumferential surface of the turning shaft 4 through a bearing clearance 10. Then, on an inner circumferential surface of the step-groove bearing 3, a step groove 20 having a diameter greater than that of the step-groove bearing surface 3a is formed. To provide further detail with reference to FIG. 1B, on an inner circumferential wall surface of the step-groove bearing 3, the step-groove bearing surface 3a, which has a convex surface being protruded in a radial direction to be step-shaped, is placed intermittently at 3 locations. Moreover, the step groove 20 in an axial direction, which is adjacent to an end section of each of the step-groove bearing surfaces 3a and is a groove stepped in a radial direction (step), is formed intermittently at 3 locations. Meanwhile, between the turning shaft 4 and the step-groove bearing surfaces 3a, the bearing clearance 10 is formed and the bearing clearance 10 is filled with a lubricant fluid such as oil and so on.

In FIG. 1A, the bearing holder 2 is provided with an opening part at its upper end side so as to be constructed like a pocket shape with a closed bottom. At a bottom surface of a concave section of the bearing holder 2, thrust bearing 5 is fixedly placed. The thrust bearing 5 is equipped with a thrust bearing surface 5a to support the bottom end surface 4a of the turning shaft 4. Furthermore, the bottom end surface 4a of the turning shaft 4 is formed and finished to be spherical in order to reduce friction resistance between the bottom end surface 4a itself and the thrust bearing surface 5a at the time when the turning shaft 4 rotates.

Hereby, when the bottom end surface 4a of the turning shaft 4 is formed and finished to be spherical, an edge section 4b is formed at a boundary between the spherical part and the round bar part of the shaft itself, being close to the bottom end surface 4a of the turning shaft 4. If the edge section 4b is positioned inside an internal area of the step-groove bearing 3, there may arise a chance that the step-groove bearing surfaces 3a is damaged by contacting of the step-groove bearing surfaces 3a and the edge section 4b in turning motion. Therefore, the bottom end surface 4a of the turning shaft 4 is constructed so as to protrude from a bottom end surface 3b of the step-groove bearing 3 for a specified dimension so that the edge section 4b is positioned outside the step-groove bearing 3.

As a result, there comes up a large space surrounded by a bottom end section 4c of the turning shaft 4, the bottom end surface 3b of the step-groove bearing 3, and the bearing holder 2 (refer to FIG. 1A). Then, if such a large space exists around the bottom end section 4c of the turning shaft 4, the air held in the space prevents fully charging a lubricant fluid such as oil and so on at the time when the lubricant fluid such as oil and so on is charged, and eventually the air may readily remain there. If the environment temperature changes under such a condition, the air expands or shrinks so as to possibly cause a chance that the lubricant fluid may leak out externally through the bearing clearance 10. In particular, at the step grooves 20 formed on the inner circumferential surface of the step-groove bearing 3, the cross section there is larger in comparison with the bearing clearance 10 between the turning shaft 4 and the step-groove bearing surfaces 3a so as to accordingly cause less capillary attraction force, and eventually there is a chance that the lubricant fluid existing in the step grooves 20 may centrally leak out.

Thus, in the bearing unit 1 relating to the embodiment of the present invention, air discharging grooves 30 in an axial direction are formed intermittently at 3 locations to be semi-circular grooves on an outer circumferential surface of the step-groove bearing 3 (refer to FIG. 1B). Where the depth of the step grooves 20 and that of the air discharging grooves 30 (if there are some types of air discharging grooves 30 having each different groove depth, the shallowest one is selected for this comparison) are expressed as "d" and "d'", respectively, a relationship formula d<d' becomes valid. Furthermore, where the cross section of the step grooves 20 and that of the air discharging grooves 30 are expressed as "S" and "S'", respectively, a relationship formula S<S' becomes valid.

According to the arrangement described above, the air held in the space surrounded by the bottom end section 4c of the turning shaft 4, the bottom end surface 3b of the step-groove bearing 3, and the bearing holder 2 is discharged externally through the air discharging grooves 30 that are provided with further less capillary attraction force in comparison with the bearing clearance 10 and the step grooves 20 are. In other words, it becomes possible to secure air discharging paths. Therefore, under the situation it is possible to prevent the air from passing through the bearing clearance 10 or the step grooves 20 (particularly, through the step grooves 20 having less capillary attraction force than the bearing clearance 10 has) to flow into the rotor side. Accordingly, it is possible to prevent lubricant fluid existing in the bearing clearance 10 and the step grooves 20 from leaking out externally.

FIG. 2 is an explanatory drawing to explain an additional condition on a relationship formula being valid between the step grooves 20 and the air discharging grooves 30 shown in the widthwise cross sectional view of FIG. 1B.

In FIG. 2, the bearing unit 1 relating to the embodiment of the present invention is equipped with the step grooves 20 formed at 3 locations, and the cross sections of the step grooves 20 are each expressed as S1, S2, and S3. Moreover, the bearing unit 1 relating to the embodiment of the present invention is also equipped with the air discharging grooves 30 formed at 3 locations, and the cross sections of the air discharging grooves 30 are each expressed as S1', S2', and S3'. Under the defining condition described above, a relationship formula (S1+S2+S3)<(S1'+S2'+S3') becomes valid. In other words, the air held in the space surrounded by the bottom end section 4c of the turning shaft 4, the bottom end surface 3b of the step-groove bearing 3, and the bearing holder 2 can further surely be discharged externally through the air discharging grooves 30. Therefore, consequently it is further surely possible to prevent the lubricant fluid existing in the bearing clearance 10 and the step grooves 20 from leaking out externally.

Figure 3:
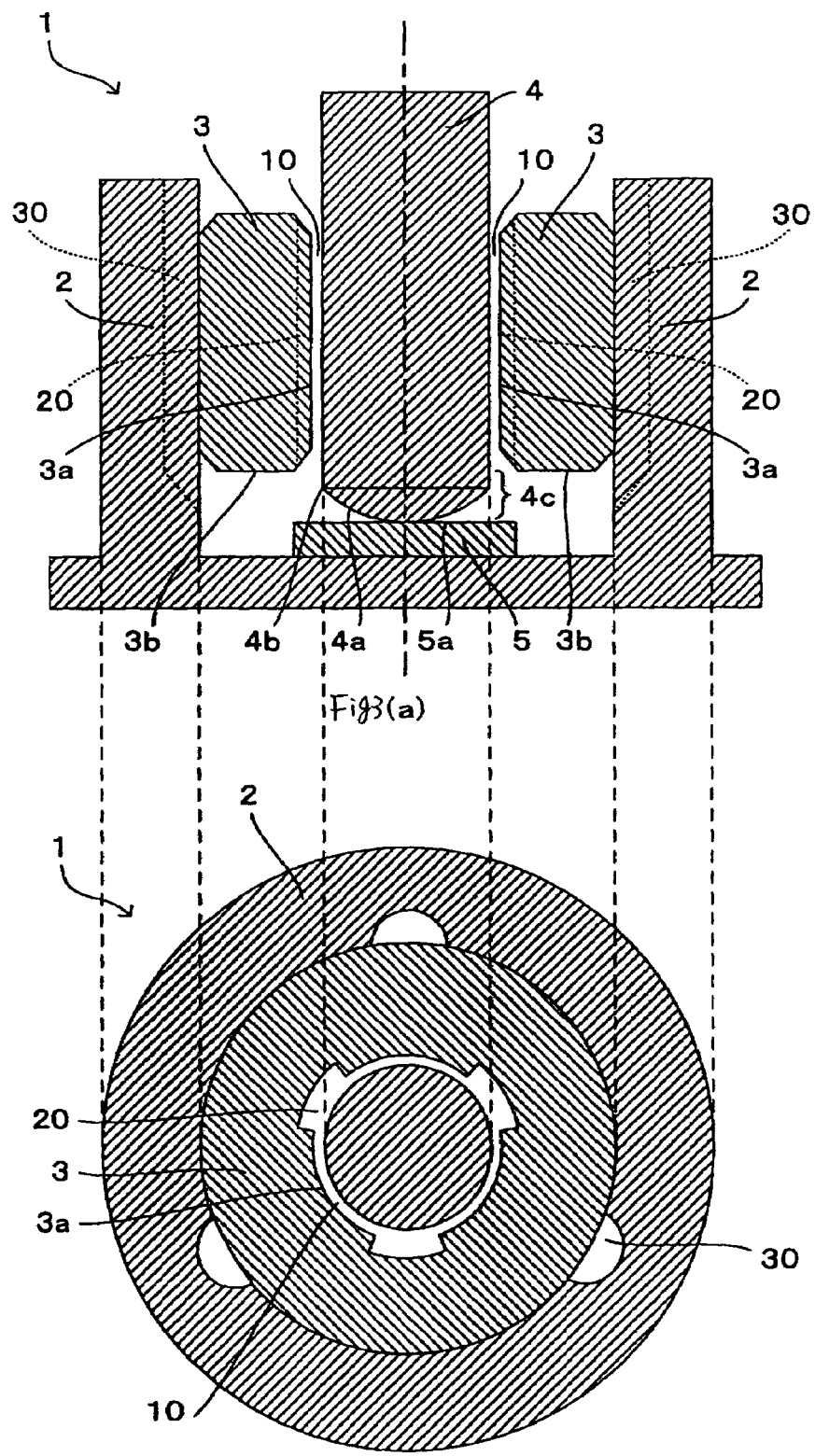
FIG. 3 shows cross section drawings of mechanical constitution of a bearing unit relating to an embodiment of the present invention.

FIG. 3 shows cross section drawings of mechanical constitution of a bearing unit 1 relating to an embodiment of the present invention. In more detail, FIG. 3A and FIG. 3B are a longitudinal cross sectional view of the bearing unit 1 in the horizontal viewing direction and a widthwise cross sectional view of the top view of the bearing unit 1, respectively.

Being different from the bearing unit 1 shown in FIG. 1, the bearing unit 1 shown in FIG. 3 is provided with air discharging grooves 30 in an axial direction formed intermittently at 3 locations to be semicircular grooves on an inner circumferential surface of the bearing holder 2 (refer to FIG. 3B). In the same way as described in the case of the bearing unit 1 shown in FIG. 1, the arrangement described above makes it possible to externally discharge the air held in the space surrounded by the bottom end section 4c of the turning shaft 4, the bottom end surface 3b of the step-groove bearing 3, and the bearing holder 2 through the air discharging grooves 30 that are provided with further less capillary attraction force in comparison with the bearing clearance 10 and the step grooves 20. As a result, it is possible to prevent the lubricant fluid existing in the bearing clearance 10 and the step grooves 20 from leaking out externally.

Figure 4:
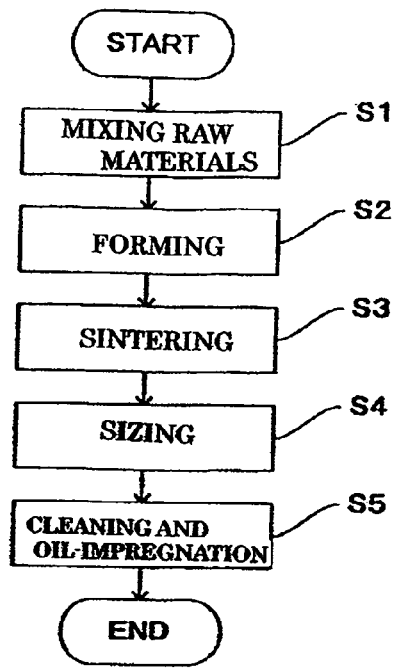
FIG. 4 is a flowchart to explain a manufacturing method of a step-groove bearing of a bearing unit relating to an embodiment of the present invention.

FIG. 4 is a flowchart to explain a manufacturing method of the step-groove bearing 3 of the bearing unit 1 relating to the embodiment of the present invention.

In FIG. 4, raw materials are mixed up together at first (Step S1). For example, copper-plated iron powder including iron, copper, tin, and so on is mixed up with a fixed lubricant in the proportion of 0.1 to 4 wt %.

Next, a forming process is carried out (Step S2). More concretely to describe, vertical grooves (the air discharging grooves 30 shown in FIG. 1) are formed on the outer circumferential surface of the step-groove bearing 3, and the inner circumferential surface of the step-groove bearing 3 is formed to be a perfect circle. At this time, the density of the part is 75 to 90% in proportion to the ultimate density. Furthermore, when the outer diameter and inner diameter of the step-groove bearing 3 are 6 mm and 3 mm, respectively, the depth of the air discharging grooves 30 is formed to be 0.1 to 1.0 mm. However, to have a more effective depth, it is preferred to form the depth to be 0.1 to 0.5 mm. A possible reason to be described is that the air discharging grooves 30 are excessively deep in comparison with the wall thickness of the bearing in a radial direction, strength of the bearing is deteriorated so as to become a cause of deformation. If the air discharging grooves 30 are formed in the bearing holder 2, the grooves are formed to be 0.1 mm or more in depth.

Next, a sintering process is carried out at a specified temperature (Step S3). For the sintering process, it is neither required to raise the temperature so as to melt the material, nor needed to implement the processing operation in a harsh condition. As a result, freedom from any deformation can be maintained.

Next, a sizing process is carried out (Step 4). More concretely to describe, the outer circumference of the step-groove bearing 3 is made to be a perfect circle while the inner circumference of the step-groove bearing 3 is made to be step-shaped through the sizing process. Under the condition, the porous structure of the air discharging grooves 30 (refer to FIG. 1A) formed on the outer circumferential surface of the step-groove bearing 3 becomes rough, while the porous structure of the step grooves 20 (refer to FIG. 1A) formed on the inner circumferential surface of the step-groove bearing 3 becomes fine. At this time, the depth of the step grooves 20 is formed to be 1 to 20 micrometers at the shallowest part. However, to have a more effective depth, it is preferred to form the depth to be 3 to 8 micrometers.

Finally, a cleaning and oil-impregnation process is carried out (Step 5). Through the processes described above, the step-groove bearing 3 of the bearing unit 1 is manufactured. Then, by press-fitting the step-groove bearing 3 into the inner bore of the bearing holder 2 and inserting the turning shaft 4 into the bearing bore of the step-groove bearing 3, the bearing unit 1 is completed in the end. When the bearing unit 1 is applied, it is possible with the air discharging grooves 30 to secure air discharging paths, and then eventually it is possible to prevent the lubricant fluid, which exists in the bearing clearance 10 and the step grooves 20, from leaking out externally.

Figure 5:
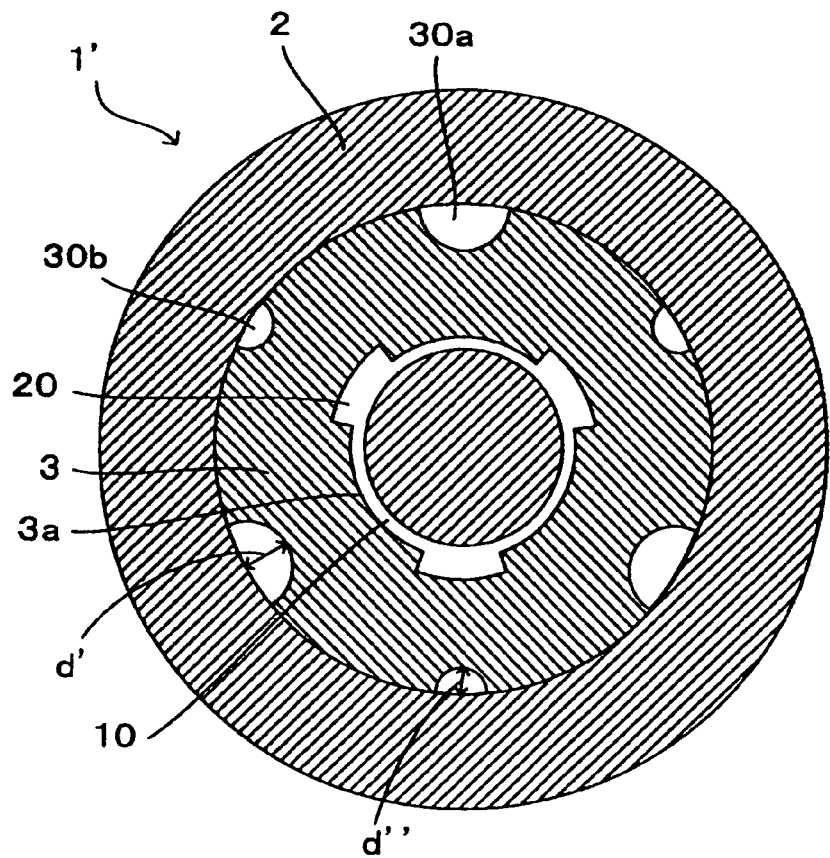
FIG. 5 is a widthwise cross sectional drawing to illustrate mechanical constitution of a bearing unit relating to another embodiment of the present invention.

FIG. 5 is a widthwise cross sectional drawing to illustrate mechanical constitution of a bearing unit 1' relating to another embodiment of the present invention.

In FIG. 5, the bearing unit 1' relating to the other embodiment of the present invention is provided, in addition to the air discharging grooves 30 shown in the bearing unit 1 (refer to FIG. 1) relating to the embodiment of the present invention (the grooves are illustrated in FIG. 5, as the air discharging grooves 30a), with extra discharging grooves 30b that are placed intermittently at 3 locations through the sizing process to be shallower in the groove depth direction than the discharging grooves 30a. That is to say, where the depth of air discharging grooves 30a and that of the air discharging grooves 30b are expressed as d' and d", respectively, a relationship formula d'>d" becomes valid. It is preferable that the depth of the air discharging grooves 30b, d", is made to be shallower than 50 micrometers.

According to the arrangement described above, the air held in the space surrounded by the bottom end section 4c of the turning shaft 4, the bottom end surface 3b of the step-groove bearing 3, and the bearing holder 2 (refer to FIG. 1) can be discharged externally through the air discharging grooves 30a, and still further an excessive lubricant remaining in the air discharging grooves 30b can be collected within the step-groove bearing 3. Moreover, by having a rougher porous structure of the air discharging grooves 30b, it becomes possible to improve the collection efficiency of the excessive lubricant in the air discharging grooves 30b.

FIG. 6 is widthwise cross sectional drawings to illustrate mechanical constitution of bearing units 1' relating to still other embodiments of the present invention.

A bearing unit 1' shown in FIG. 6A is equipped with, not the step-groove bearing 3 having the step grooves 20 but a taper-groove bearing 3' having taper grooves 20', as a bearing in which a bearing bore to support the turning shaft 4 is formed so as to enable the turning shaft 4 to turn. Then, in the case of a bearing unit 1' shown in FIG. 6B, air discharging grooves 30', each of which has a stepped shape, are formed on the outer circumferential surface of the step-groove bearing 3, instead of the air discharging grooves 30, each of which has a semicircular cross section.

Thus, for the present invention, it does not matter what shape is applied for each of the grooves to be formed on the inner circumferential surface of the bearing, in which the bearing bore to support the turning shaft 4 is formed so as to enable the turning shaft to turn, as well as each of the grooves to be formed on the outer circumferential surface of the bearing.

Figure 7:
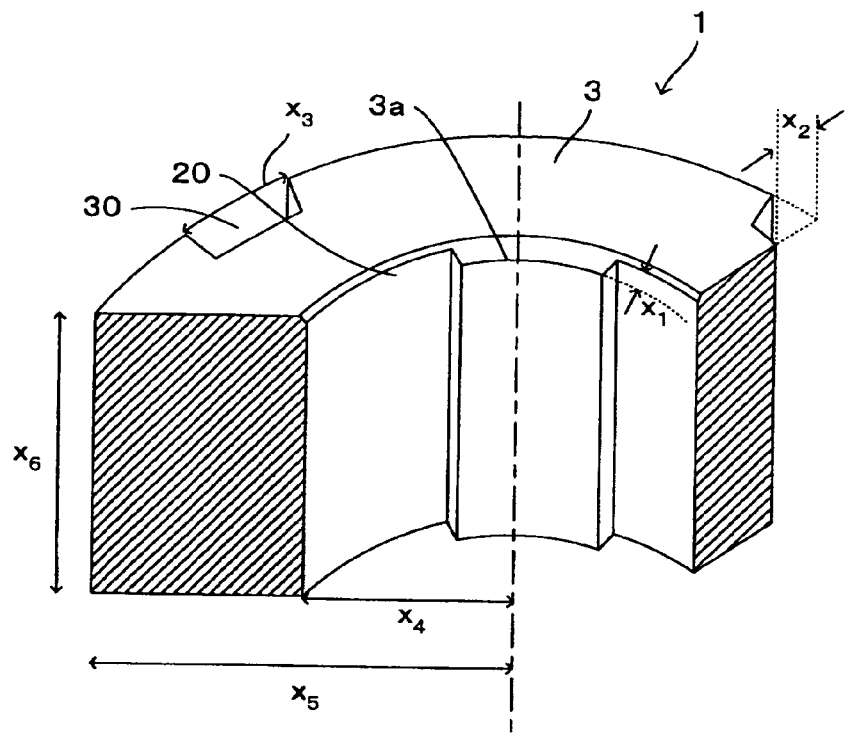
FIG. 7 is a cross sectional bird's-eye view drawing to explain mechanical constitution of a bearing unit relating to a working example of the present invention.

FIG. 7 is a cross sectional bird's-eye view drawing to explain mechanical constitution of the bearing unit 1 relating to a working example of the present invention. FIG. 7 shows a case where the present invention is applied for a step-groove bearing having straight steps on its inner circumference, and a use of such a bearing unit can be for a spindle motor, for example.

In the bearing unit 1 relating to the working example of the present invention shown in FIG. 7, the step grooves 20, which include 4 sets in total, are formed on the inner circumferential surface of the step-groove bearing 3, and the depth (=x1) of each of the step grooves 20 is 3 to 8 micrometers. Moreover, the extent of each of the step grooves is 45 degrees. Meanwhile, the air discharging grooves 30, formed on the outer circumferential surface of the step-groove bearing 3, include 4 sets in total, and the depth (=x2) of each of the air discharging grooves 30 is 0.1 mm and the width (=x3) is 0.2 mm.

On the other hand, the inner diameter (=x4) of the step-groove bearing 3 is 3 mm, its outer diameter (=x5) is 6 mm, and its length (=x6) is 4 mm. Furthermore, the clearance in the radial direction between the turning shaft 4 and the step-groove bearing 3 is 1 to 2 micrometers. Moreover, a material of the step-groove bearing 3 is iron-copper-tin base (Fe 50%, Cu—Sn 50%) material. Then, the bearing clearance 10 is filled with synthetic hydrocarbon-base oil having viscosity of VG32, as lubricant fluid.

As the material of the step-groove bearing 3, a material having low breathability is preferred. For example, a material including copper-plated iron powder (−100 mesh, 40% Cu-plated part is 30 to 90%, and the remains are 9 Cu—Sn) may be used, and the density of the step-groove bearing 3 can be made to be 75 to 90% in proportion to the ultimate density. Furthermore, the porous structure on the inner circumferential surface of the step-groove bearing 3 is formed to be complex and less porous. Thus, the breathability can be made to be less so that oozing of the lubricant inside the step-groove bearing 3 to be caused by raised temperature becomes less significant, and inconvenience due to oozing of the lubricant fluid can be avoided. Furthermore, oil films can be formed quickly on the step-groove bearing surfaces 3a so as to improve the motor performance.

Figure 8:
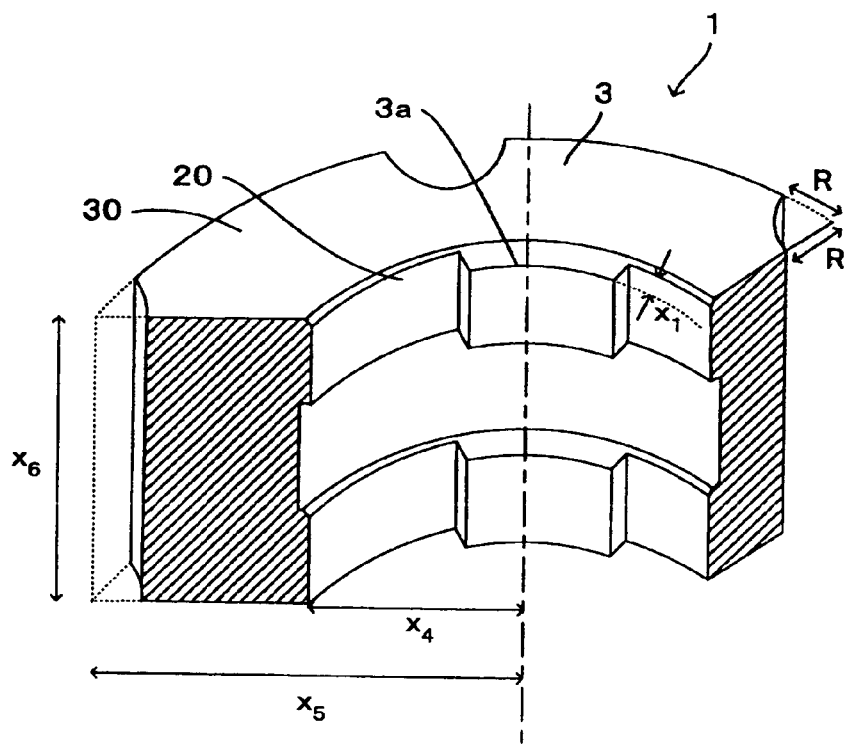
FIG. 8 is a cross sectional bird's-eye view drawing to explain mechanical constitution of a bearing unit relating to a working example of the present invention.

FIG. 8 is a cross sectional bird's-eye view drawing to explain mechanical constitution of the bearing unit 1 relating to a working example of the present invention. FIG. 8 shows a case where the present invention is applied for a step-groove bearing having relief clearance parts on its inner circumference, and a use of such a bearing unit can be for a spindle motor, for example.

In the bearing unit 1 relating to the working example of the present invention shown in FIG. 8, the step grooves 20, which include 4 sets in total, are formed on the inner circumferential surface, and the depth (=x1) of each of the step grooves 20 is 3 to 8 micrometers. Moreover, the extent of each of the step grooves is 45 degrees. Meanwhile, the air discharging grooves 30, formed on the outer circumferential surface of the step-groove bearing 3, include 6 sets in total, and each of the air discharging grooves 30 is formed to be semicircular (R=0.1 mm).

On the other hand, the inner diameter (=x4) of the step-groove bearing 3 is 3 mm, its outer diameter (=x5) is 6.5 mm, and its length (=x6) is 10 mm. Furthermore, the clearance in the radial direction between the turning shaft 4 and the step-groove bearing 3 is 1 to 2 micrometers. Moreover, a material of the step-groove bearing 3 is iron-copper-tin base (Fe 50%, Cu—Sn 50%) material. Then, the bearing clearance 10 is filled with synthetic hydrocarbon-base oil having viscosity of VG22, as lubricant fluid.

According to the bearing unit 1 shown in FIG. 7 and/or FIG. 8, the air held in the space surrounded by the bottom end section 4c of the turning shaft 4, the bottom end surface 3b of the step-groove bearing 3, and the bearing holder 2 can be discharged externally through the air discharging grooves 30. Furthermore, it is possible to suitably prevent the lubricant fluid charged into the bearing clearance 10 (in particular, the lubricant fluid existing in the step grooves 20) from leaking out. Even in the case of a bearing unit equipped with a type of bearing, in which a perfect circle section is partially placed being close to an end surface of the step-groove bearing 3, the present invention can be applied so as to obtain the same effect.

A bearing unit relating to the present invention is valuable regarding its way of preventing the lubricant, which exists in the clearance between the internal surface of the oil-impregnated bearing material part and the turning shaft, from leaking out.

While the foregoing description and drawings represent the present invention, it will be obvious to those skilled in the art that various changes may be made therein without departing from the true spirit and scope of the present invention.

What is claimed is:

1. A bearing unit comprising:
a cylindrical oil-impregnated bearing, in which a bearing bore to support a turning shaft is formed so as to enable the turning shaft to turn;
a bearing holder, in which the oil-impregnated bearing is fixed by an inner bore;
a first groove being formed in an axial direction on an inner circumferential surface of the oil-impregnated bearing;
a second groove being formed in an axial direction on at least one of an outer circumferential surface of the oil-impregnated bearing and an inner circumferential surface of the bearing holder;
said second groove being formed so as to have a greater depth than that of the first groove; and
said second groove being formed so as to have a larger cross section than that of the first groove;
wherein the first groove and the second groove are each formed in plural numbers;
wherein a total cross section of the second grooves is greater than a total cross section of the first grooves; and
wherein a part of the plurality of second grooves is formed so as to be shallower in the depth direction than the other second grooves.

2. The bearing unit according to claim 1;
wherein the first groove and the second groove are laid out in such a manner that the first groove and the second groove are not oriented in the same radial direction.

3. The bearing unit according to claim 1;
wherein the first groove is a stepped groove being protruded in a radial direction with a stepped shape.

4. A bearing unit comprising:
a cylindrical oil-impregnated bearing, in which a bearing bore to support a turning shaft is formed so as to enable the turning shaft to turn;
a bearing holder, in which the oil-impregnated bearing is fixed by an inner bore;
a first groove being formed in an axial direction on an inner circumferential surface of the oil-impregnated bearing;
a second groove being formed in an axial direction on at least one of an outer circumferential surface of the oil-impregnated bearing and an inner circumferential surface of the bearing holder;
said second groove being formed so as to have a greater depth than that of the first groove; and
said second groove being formed so as to have a larger cross section than that of the first groove;
wherein the first groove and the second groove are each formed in plural numbers;
wherein a total cross section of the second grooves is greater than a total cross section of the first grooves; and
wherein a part of the plurality of second grooves is formed so as to have a rougher porous structure than the other second grooves.

5. The bearing unit according to claim 4;
wherein the first groove and the second groove are laid out in such a manner that the first groove and the second groove are not oriented in the same radial direction.

6. The bearing unit according to claim 4;
wherein the first groove is a stepped groove being protruded in a radial direction with a stepped shape.

* * * * *